(12) United States Patent
Gao et al.

(10) Patent No.: US 9,840,422 B2
(45) Date of Patent: *Dec. 12, 2017

(54) MAGNESIUM MODIFIED ULTRA-STABLE RARE EARTH Y-TYPE MOLECULAR SIEVE AND PREPARATION METHOD THEREFOR

(75) Inventors: Xionghou Gao, Beijing (CN); Haitao Zhang, Beijing (CN); Hongchang Duan, Beijing (CN); Chaowei Liu, Beijing (CN); Di Li, Beijing (CN); Xueli Li, Beijing (CN); Zhengguo Tan, Beijing (CN); Yunfeng Zheng, Beijing (CN); Xiaoliang Huang, Beijing (CN); Jinjun Cai, Beijing (CN); Chenxi Zhang, Beijing (CN)

(73) Assignee: PetroChina Company Limited, Beijing (CN)

( * ) Notice: Subject to any disclaimer, the term of this patent is extended or adjusted under 35 U.S.C. 154(b) by 680 days.

This patent is subject to a terminal disclaimer.

(21) Appl. No.: 14/365,432
(22) PCT Filed: Apr. 13, 2012
(86) PCT No.: PCT/CN2012/000506
§ 371 (c)(1),
(2), (4) Date: Feb. 16, 2015
(87) PCT Pub. No.: WO2013/086765
PCT Pub. Date: Jun. 20, 2013

(65) Prior Publication Data
US 2015/0175432 A1 Jun. 25, 2015

(30) Foreign Application Priority Data
Dec. 15, 2011 (CN) .......................... 2011 1 0419914

(51) Int. Cl.
| | |
|---|---|
| B01J 29/06 | (2006.01) |
| C01B 39/24 | (2006.01) |
| B01J 29/08 | (2006.01) |
| B01J 29/80 | (2006.01) |
| B01J 35/10 | (2006.01) |
| C10G 11/05 | (2006.01) |
| B01J 35/02 | (2006.01) |
| C01B 39/02 | (2006.01) |

(Continued)

(52) U.S. Cl.
CPC ............. *C01B 39/24* (2013.01); *B01J 29/084* (2013.01); *B01J 29/088* (2013.01); *B01J 29/80* (2013.01); *B01J 35/023* (2013.01); *B01J 35/10* (2013.01); *B01J 35/109* (2013.01); *B01J 37/08* (2013.01); *B01J 37/30* (2013.01); *C01B 39/026* (2013.01); *C10G 11/05* (2013.01); *B01J 2229/18* (2013.01); *B01J 2229/186* (2013.01); *B01J 2229/40* (2013.01); *B01J 2229/42* (2013.01)

(58) Field of Classification Search
CPC ........ B01J 29/088; B01J 29/084; B01J 29/80; B01J 2229/40; B01J 2229/146; B01J 2229/42; B01J 35/10; B01J 35/109; B01J 37/30; B01J 2229/16; C01B 39/24; C01B 39/026
USPC ........ 502/65, 73, 79, 85; 423/700, 701, 714, 423/715
See application file for complete search history.

(56) References Cited

U.S. PATENT DOCUMENTS

| | | |
|---|---|---|
| 3,595,611 A | 7/1971 | McDaniel et al. |
| 4,218,307 A | 8/1980 | McDaniel |
| 4,584,287 A | 4/1986 | Ward |

(Continued)

FOREIGN PATENT DOCUMENTS

| | | |
|---|---|---|
| CN | 1031030 A | 2/1989 |
| CN | 1217231 A | 5/1999 |

(Continued)

OTHER PUBLICATIONS

Machine translation of CN 102133542, Shanxiang et al., Jul. 27, 2011.*

(Continued)

*Primary Examiner* — Elizabeth Wood
(74) *Attorney, Agent, or Firm* — Meunier Carlin & Curfman LLC

(57) ABSTRACT

The present invention provides a magnesium-modified ultra-stable rare earth type Y molecular sieve and the preparation method thereof, which method is carried out by subjecting a NaY molecular sieve as the raw material to a rare earth exchange and a dispersing pre-exchange, then to an ultra-stabilization calcination treatment, and finally to a magnesium modification. The molecular sieve comprises 0.2 to 5% by weight of magnesium oxide, 1 to 20% by weight of rare earth oxide, and not more than 1.2% by weight of sodium oxide, and has a crystallinity of 46 to 63%, and a lattice parameter of 2.454 nm to 2.471 nm. In contrast to the prior art, in the molecular sieve prepared by this method, rare earth ions are located in sodalite cages, which is demonstrated by the fact that no rare earth ion is lost during the reverse exchange process. Moreover, the molecular sieve prepared by such a method has a molecular particle size D(v,0.5) of not more than 3.0 μm and a D(v,0.9) of not more than 20 μm. Such a molecular sieve has both high stability and high selectivity for the target product, while cracking catalysts using the molecular sieve as an active component is characterized by a high heavy-oil-conversion capacity and a high yield of valuable target products.

20 Claims, No Drawings

(51) Int. Cl.
*B01J 37/08* (2006.01)
*B01J 37/30* (2006.01)

(56) References Cited

U.S. PATENT DOCUMENTS

| | | |
|---|---|---|
| 5,340,957 A | 8/1994 | Clark |
| 2002/0094931 A1 | 7/2002 | Wang et al. |
| 2011/0224067 A1 | 9/2011 | Wormsbecher et al. |

FOREIGN PATENT DOCUMENTS

| | | |
|---|---|---|
| CN | 1297018 A | 5/2001 |
| CN | 1075466 C | 11/2001 |
| CN | 1202007 C | 8/2003 |
| CN | 1506161 A | 6/2004 |
| CN | 1215905 C | 8/2005 |
| CN | 1676463 A | 10/2005 |
| CN | 1683474 A | 10/2005 |
| CN | 1307098 C | 3/2007 |
| CN | 1958452 A | 5/2007 |
| CN | 100344374 C | 10/2007 |
| CN | 101147875 A | 3/2008 |
| CN | 101190416 A | 6/2008 |
| CN | 101284243 A | 10/2008 |
| CN | 101285001 A | 10/2008 |
| CN | 100497175 C | 6/2009 |
| CN | 101767027 A | 7/2010 |
| CN | 102029177 A | 4/2011 |
| CN | 102133542 A | 7/2011 |
| CN | 101210187 B | 9/2011 |
| JP | 59-168089 A | 9/1984 |
| WO | 0112546 A1 | 2/2001 |

OTHER PUBLICATIONS

Machine translation of CN 101284243, Lingping et al., Oct. 15, 2008.*
Examination report issued for corresponding European Patent Application No. 12858105.5 dated Jun. 17, 2016.
Search Report received in related CN application No. 201110420931.3 dated Nov. 25, 2011 and English translation.
International Search Report received in related International application No. PCT/CN2012/000509 dated Sep. 27, 2012 and English translation.
International Search Report received in related International application No. PCT/CN2012/000506 dated Sep. 20, 2012 and English translation.
Search Report received in related CN application No. 201110419914.8 dated Nov. 23, 2011 and English translation.
Extended European Search Report for European patent application No. 12858105 dated Jul. 21, 2015 (6 pages).

* cited by examiner

MAGNESIUM MODIFIED ULTRA-STABLE RARE EARTH Y-TYPE MOLECULAR SIEVE AND PREPARATION METHOD THEREFOR

FIELD OF TECHNOLOGY

The present invention relates to a magnesium-modified ultra-stable rare earth type Y molecular sieve and the preparation method thereof, and more particularly, to a magnesium-modified ultra-stable rare earth type Y molecular sieve having an improved light oil yield and the preparation method thereof.

BACKGROUND ART

Catalytic cracking apparatuses are crucial means for crude oil refining, and the economic benefits of refineries depend on the overall product distribution of these apparatuses, especially on the yield of high-value light oil products. Recently, because of the growing trend towards heavier crude oils, a higher light-oil yield is demanded for FCC catalysts. Being the essential active component that determines the reaction selectivity of heavy oil cracking catalysts, a type Y molecular sieve having high target product selectivity and high activity stability has been the key technical subject of research in the field of catalysis.

To pursue a high-value light oil yield and improve target product selectivity, elements such as magnesium and phosphorous are used both domestically and abroad to modify and adjust the molecular sieve to have suitable acidity, so as to control the ratio between different reactions during the cracking process, reduce further cracking of light oil, and improve the yield of light oil.

Patent CN1683474A describes a preparation method of a co-catalyst that improves the yield of the target product diesel, comprising steps of calcinating kaolin at 900° C. for its in situ crystallization into a type Y zeolite co-catalyst, and subsequently subjecting it to an exchange modification by using salts of magnesium, rare earth and/or ammonium so as to produce a co-catalyst having a high diesel yield. Stability is not described with regard to this method.

Patent CN1217231A describes a preparation method of a phosphorous-containing faujasite catalyst that improves the yield of the target product diesel, comprising steps of thoroughly mixing a faujasite having less than 5% by weight of $Na_2O$, with or without rare earth, and an aqueous solution of a phosphorous-containing compound, then allowing the mixture to stand for 0 to 8 hours, performing drying and calcination to obtain a phosphorous-containing faujasite, and then producing a catalyst with a high diesel yield by a semi-synthetic process. Stability is not described with regard to this method either.

In order to improve the stability of type Y molecular sieves, as a method widely adopted both domestically and abroad, type Y molecular sieves are modified with rare earth via ion exchange, which, in combination of optimization of calcination conditions, allows as many rare earth ions as possible to migrate into sodalite cages so as to suppress dealumination of the molecular sieve framework and therefore to improve the structural stability and the activity stability of the molecular sieves. Currently, NaY molecular sieve modification methods generally fall into three categories: the first category involves subjecting NaY molecular sieves to ion exchange with a small amount of rare earth and/or ammonium ions, and to subsequent calcination, and then conducting a rare earth ion and/or ammonium treatment or a dealumination treatment to prepare a REUSY molecular sieve (U.S. Pat. No. 3,595,611, U.S. Pat. No. 4,218,307, CN87104086.7); the second category involves preparing a USY molecular sieve from a NaY molecular sieve first, and then carrying out rare earth exchange to prepare a REUSY (ZL200510114495.1, ZL200410029875.0); and the third category involves introducing a precipitating agent during the rare-earth modification of NaY molecular sieves to form a rare earth precipitate so as to improve the heavy metal-resistant ability, the cracking activity and the rare earth utilization during preparation of the molecular sieves (ZL02103909.7, ZL200410058089.3, ZL02155600.8). None of the type Y molecular sieve modification methods provided in the above patent documents specifies the precise localization of rare earth ions, and therefore the activity stability and the structural stability of the type Y molecular sieves prepared in the prior art cannot adapt to the growing trend towards crude oils having higher density and poorer quality.

US patents (U.S. Pat. No. 5,340,957, U.S. Pat. No. 4,584,287) describe a method for modifying type Y molecular sieves, comprising steps of modifying the raw material, i.e. a NaY molecular sieve, via an exchange reaction with rare earth and/or Group VIII elements, and then subjecting it to a hydrothermal treatment to afford an ultra-stable rare earth type Y molecular sieve having high stability. Localization of the rare earth ions or grain distribution is not described with regard to the method.

Chinese patent ZL97122039.5 describes a preparation method of ultra-stable Y zeolites, comprising steps of putting a Y zeolite into contact with an acid solution and an ammonium-containing solution, and subjecting them to a high-temperature steam treatment, wherein the amount of the acid used is 1.5 to 6 moles of hydrogen ions per mole of framework aluminum, the concentration of the acid solution is 0.1 to 5 N, the Y zeolite is kept in contact with the acid solution at a temperature of 5 to 100° C. for a duration of 0.5 to 72 h, and the weight ratio between the Y zeolite and the ammonium ion is 2 to 20. The modification method in accordance with this patent requires addition of an ammonium-containing solution for the purpose of lowering the sodium oxide content in the molecular sieve or reducing the damage to the molecular sieve structure caused by acidic gases during calcination. However, this technique has the following technical disadvantages: 1) since a large number of ammonium ions are added in the preparation process, ammonium-containing ions eventually enter the atmosphere or waste water, increasing ammonia nitrogen pollution and the cost for pollution control; 2) the method of this patent is unable to solve the issue of particle agglomeration in molecular sieves, which issue reduces specific surface area and pore volume of the molecular sieve and increases the obstruction in the pore channel during exchange in the molecular sieve, making it difficult to accurately and quantitatively localize the modifying element in the cages of the molecular sieve; 3) moreover, in this patent it is further mentioned that rare earth ions may also be introduced by ion exchange, during or after the contact between the Y zeolite and the ammonium-containing solution, and that during the ion exchange, ammonium ions compete with rare earth ions and preferentially take up the positions intended for rare earth ions, thereby hindering rare earth ions from entering the cages of the molecular sieve by exchange, and also lowering the utilization of rare earth ions.

Chinese patent ZL02103909.7 describes a method for preparing rare earth-containing ultra-stable Y molecular sieves by subjecting a NaY molecular sieve to one exchange process and one calcination process, characterized in that the NaY molecular sieve is placed in an ammonium-containing solution and subjected to chemical dealumination at 25 to 100° C. for 0.5 to 5 h, wherein the chemical dealumination chelating agent contains oxalic acid and/or oxalate salts, a rare earth solution is then introduced under stirring to produce a rare earth precipitate that contains rare earth oxalate, and the precipitate is filtered and washed to give a filter cake, followed by a hydrothermal treatment to afford the molecular sieve product. Although the molecular sieve prepared by this method has certain resistance to vanadium contamination, it has relatively low activity stability and cracking activity, and is insufficient to meet the requirement set out by the growing trend towards crude oils having higher density and poorer quality. This issue is mainly attributed to the distribution of rare earth ions in the super-cages and sodalite cages of the molecular sieve during modification. This method demonstrates that rare earth ions are present in the molecular sieve system in two forms, i.e., a part of the rare earth enters sodalite cages in an ionic form, while the other part is scattered over the surface of the molecular sieve as an independent phase of rare earth oxide (the precursor of which is rare earth oxalate and is converted into rare earth oxide after subsequent calcination). Such distribution reduces the stabilizing and supporting effect of rare earth ions on the molecular sieve structure. Furthermore, this method also poses a remarkable problem of ammonium nitrogen pollution, and the oxalic acid or oxalate salts added are also toxic and detrimental to the environment and human.

Chinese patent 200510114495.1 describes a method for increasing the rare earth content in ultra-stable type Y zeolites. In this method, an ultra-stable type Y zeolite and an acidic solution at a concentration of 0.01 to 2 N are sufficiently mixed in a solid-to-liquid ratio of 4-20 at a temperature of 20 to 100° C., treated for 10 to 300 minutes, washed and filtered, then subjected to rare earth ion exchange upon addition of a rare earth salt solution, and then washed, filtered and dried after the exchange, to afford a rare earth ultra-stable type Y zeolite. In this invention, a type Y molecular sieve obtained from water-vapor ultra-stabilization calcination is used as the raw material and subjected to a second exchange and a second calcination for chemical modification, but no investigation on dispersibility of molecular sieve particles is involved.

CN200410029875.0 discloses a preparation method of a rare earth ultra-stable type Y zeolite, characterized in that, in this method, a NaY molecular sieve is subjected to ion exchange with an inorganic ammonium solution first, and then subjected to a water vapor ultra-stabilization treatment to obtain a "one-exchange one-calcination" product; the "one-exchange one calcination" product is then added into a mixed solution of a rare earth salt and citric acid or a mixed solution of an inorganic ammonium salt, a rare earth salt and citric acid, and subjected to an exchange reaction at a certain temperature; and, after completion of the reaction, the molecular sieve slurry is filtered, washed, and eventually calcinated at 450 to 750° C. in air or under a 100% water vapor atmosphere for 0.5 to 4 hours. In this technique, the rare earth modification involves a second exchange modification of the "one-exchange one-calcination" product that serves as the raw material. Because of the lattice contraction in the molecular sieve after the "one-exchange one-calcination", fragmental aluminum inside the pores clogs the pore channels, increasing the hindrance to rare earth ion exchange, which renders it difficult to accurately localize rare earth ions in sodalite cages.

None of the type Y molecular sieve modification methods provided in the above patent documents specifies the precise localization of rare earth ions, and therefore the activity stability and the structural stability of the type Y molecular sieves prepared in the prior art cannot adapt to the growing trend towards crude oils having higher density and poorer quality.

In order to improve the activity stability of type Y molecular sieves and also improve their selectivity for target products, the present invention employs a precise localization technique for rare earth ions to prepare a type Y molecular sieve with high activity stability and structural stability, which is then modified with magnesium and adjusted to have suitable acidity, so that the ratio between different reactions in the cracking process is under control and the yield of light oil is improved.

SUMMARY OF THE INVENTION

An objective of the present invention is to provide a magnesium-modified ultra-stable rare earth type Y molecular sieve with high activity stability, and preparation methods thereof. The molecular sieve provided by said method has high target product selectivity, high activity stability and structural stability, a low coke yield, a great capacity for heavy oil conversion, and strong resistance to heavy metals, while said method is characterized by a simple preparation process, high utilization of the modifying element(s), and a low level of ammonium nitrogen pollution.

The present invention provides a magnesium-modified ultra-stable rare earth type Y molecular sieve, characterized in that the molecular sieve comprises 0.2 to 5% by weight of magnesium oxide, 1 to 20% by weight of rare earth oxide, not more than 1.2% by weight of sodium oxide, a crystallinity of 46 to 63%, and a lattice parameter of 2.454 nm to 2.471 nm. The preparation process of the molecular sieve includes a rare-earth exchange, a dispersing pre-exchange, and a magnesium salt exchange modification, wherein the magnesium salt exchange modification is carried out after the rare earth exchange and the dispersing pre-exchange, the order of the rare earth exchange and the dispersing pre-exchange is not limited, and the rare earth exchange and the dispersing pre-exchange are consecutively conducted without a calcination process therebetween. The dispersing pre-exchange refers to a process of adjusting the molecular sieve slurry's concentration to a solid content of 80 to 400 g/L and adding 0.2 to 7% by weight of a dispersing agent to carry out dispersing pre-exchange at an exchange temperature of 0 to 100° C. for 0.1 to 1.5 h. The dispersing agent in the dispersing pre-exchange process is selected from one or more of sesbania gum powder, boric acid, urea, ethanol, polyacrylamide, acetic acid, oxalic acid, adipic acid, formic acid, hydrochloric acid, nitric acid, citric acid, salicylic acid, tartaric acid, benzoic acid, and starch. No ammonium salt is used in the rare earth exchange or the dispersing pre-exchange.

The present invention further provides a more specific preparation method of the magnesium-modified ultra-stable rare earth type Y molecular sieve, wherein the raw material, i.e. a NaY molecular sieve (preferably with a silica-to-alumina ratio greater than 4.0, and a crystallinity greater than 70%), is subjected to a rare earth exchange, a dispersing pre-exchange and a first calcination to afford a "one-exchange one-calcination" rare earth NaY molecular sieve; the "one-exchange one-calcination" rare earth NaY molecular sieve is then subjected to ammonium exchange for sodium reduction, a magnesium salt exchange modification, and a second calcination, so as to produce a magnesium-modified ultra-stable type Y molecular sieve, wherein the order of addition of the magnesium salt and the ammonium salt is not limited, the second calcination is carried out after the ammonium exchange for sodium reduction, and the magnesium salt exchange modification may be conducted before, after, or both before and after the second calcination.

The molecular sieve preparation method recommended in the present invention preferably includes obtaining an ultra-stable rare earth sodium Y molecular sieve by "one-exchange one-calcination" and subjecting the "one-exchange one-calcination" ultra-stable rare earth sodium Y molecular sieve to a second exchange and a second calcination to produce a "two-exchange two-calcination" ultra-stable rare earth type Y molecular sieve.

In the present invention, between the rare earth exchange and the dispersing pre-exchange of the NaY molecular sieve, the molecular sieve may or may not be washed and filtered. During the rare earth exchange, $RE_2O_3$/Y-zeolite (by mass) is preferably 0.005 to 0.25, most preferably 0.01 to 0.20; the exchange temperature is 0 to 100° C., preferably 60 to 95° C.; the exchange pH is 2.5 to 6.0, preferably 3.5 to 5.5; and the exchange time is 0.1 to 2 h, preferably 0.3 to 1.5 h. During the dispersing pre-exchange, the amount of the dispersing agent added is 0.2 to 7% by weight, preferably 0.2 to 5% by weight; the exchange temperature is 0 to 100° C., preferably 60 to 95° C.; and the exchange time is 0.1 to 1.5 h. The molecular sieve slurry after modification is filtered and washed to give a filter cake, which is then dried by flash evaporation to make the water content thereof between 30% and 50%, and eventually calcinated to afford the "one-exchange one-calcination" ultra-stable rare earth sodium Y molecular sieve, wherein general conditions may be used for the calcination, for example, calcination at 350 to 700° C. under 0 to 100% water vapor for 0.3 to 3.5 h, preferably at 450 to 650° C. under 15 to 100% water vapor for 0.5 to 2.5 h.

The second exchange and the second calcination in the present invention are the ammonium exchange for sodium reduction and the ultra-stabilization process well known in the art, and are not limited in the present invention. The "one-exchange one-calcination" ultra-stable rare earth sodium Y molecular sieve may be modified first via ammonium exchange for sodium reduction, with or without filtration and washing thereafter, and then the molecular sieve is subjected to a magnesium exchange modification and a second calcination. Alternatively, the "one-exchange one-calcination" ultra-stable rare earth sodium Y molecular sieve may be modified via ammonium exchange and magnesium exchange, followed by filtration, washing and a second calcination, to produce the final product Mg-REUSY molecular sieve according to the present invention. Alternatively, the above "one-exchange one-calcination" ultra-stable rare earth sodium Y molecular sieve may be subjected to ammonium exchange first, followed by filtration, washing and a second calcination to afford a "two-exchange two-calcination" REUSY molecular sieve (also referred to as an ultra-stable rare earth type Y molecular sieve), which is then subjected to magnesium exchange modification, with or without filtration and washing thereafter, so as to produce the final product Mg-REUSY molecular sieve according to the present invention (also referred to as magnesium-modified ultra-stable rare earth type Y molecular sieve). In these processes, the order of the rare earth exchange and the dispersing pre-exchange in the "one-exchange one-calcination" preparation process is not limited; the rare earth exchange and the dispersing pre-exchange each may also be carried out twice for the reactions; the rare earth exchange and the dispersing pre-exchange are consecutively conducted without a calcination process therebetween; and no ammonium salt is used in the rare earth exchange or the dispersing pre-exchange.

In the present invention, the process of the magnesium salt exchange modification may be as follows: a "one-exchange one-calcination" ultra-stable rare earth sodium Y molecular sieve is added into deionized water, and the solid content is adjusted to 100 to 400 g/L, with the $NH_4^+$/Y zeolite (by mass) being 0.02 to 0.40, preferably 0.02 to 0.30, the $Mg^{2+}$/Y zeolite (by mass) being 0.002 to 0.08, preferably 0.002 to 0.04, and the pH being 2.0 to 7.0, preferably 3.0 to 5.0; a reaction is carried out at 0 to 100° C. for 0.3 to 1.5 hours, followed by filtration and washing of the molecular sieve slurry, and the resultant filter cake is calcinated at 450 to 700° C. under 0 to 100% water vapor for 0.3 to 3.5 h, preferably 0.5 to 2.5 h, so as to afford a magnesium-modified ultra-stable rare earth type Y molecular sieve provided in accordance with the present invention.

Alternatively, the process of the magnesium salt exchange modification may be as follows: a "one-exchange one-calcination" ultra-stable rare earth sodium Y molecular sieve is added into deionized water, and the solid content is adjusted to 100 to 400 g/L, with the $Mg^{2+}$/Y zeolite (by mass) being 0.002 to 0.08, preferably 0.002 to 0.04, the pH being 2.5 to 5.0, preferably 3.0 to 4.5; a reaction is carried out at 60 to 95° C. for 0.3 to 1.5 hours, with or without filtration and washing of the molecular sieve slurry thereafter; an ammonium exchange is then conducted for sodium reduction and modification, wherein the solid content is adjusted to 100 to 400 g/L, with the $NH_4^+$/Y zeolite (by mass) being 0.02 to 0.40, preferably 0.02 to 0.30, and the pH being 2.5 to 5.0, preferably 3.0 to 4.5, a reaction is carried out at 60 to 95° C. for 0.3 to 1.5 hours, followed by filtration and washing of the molecular sieve slurry, and the resultant filter cake is calcinated at 450 to 700° C. under 0 to 100% water vapor for 0.3 to 3.5 h, preferably 0.5 to 2.5 h, so as to afford a magnesium-modified ultra-stable rare earth type Y molecular sieve provided in accordance with the present invention.

As another alternative, the process for the magnesium salt exchange modification may be as follows: a "one-exchange one-calcination" ultra-stable rare earth sodium Y molecular sieve is added into deionized water, and the solid content is adjusted to 100 to 400 g/L, with the $NH_4^+$/Y zeolite (by mass) being 0.02 to 0.40, preferably 0.02 to 0.30, and the pH being 2.5 to 5.0, preferably 3.0 to 4.5; a reaction is carried out at 60 to 95° C. for 0.3 to 1.5 hours, with or without filtration and washing of the molecular sieve slurry thereafter; a magnesium exchange modification is then conducted, with the $Mg^{2+}$/Y zeolite (by mass) being 0.002 to 0.08, preferably 0.002 to 0.04, and the pH being 2.5 to 5.0, preferably 3.0 to 4.5, wherein a reaction is carried out at 60 to 95° C. for 0.3 to 1.5 hours, followed by filtration and washing of the molecular sieve slurry, and the resultant filter cake is calcinated at 450 to 700° C. under 0 to 100% water vapor for 0.3 to 3.5 h, preferably 0.5 to 2.5 h, so as to afford a magnesium-modified ultra-stable rare earth type Y molecular sieve provided in accordance with the present invention.

In the present invention, the process for the magnesium salt exchange modification may also be as follows: a "one-exchange one-calcination" ultra-stable rare earth sodium Y molecular sieve is added into deionized water, and the solid content is adjusted to 100 to 400 g/L, with the $NH_4^+$/Y zeolite (by mass) being 0.02 to 0.40, preferably 0.02 to 0.30, and the pH being 2.5 to 5.0, preferably 3.0 to 4.5; a reaction is carried out at 60 to 95° C. for 0.3 to 1.5 hours, followed by filtration and washing of the molecular sieve slurry, and the resultant filter cake is calcinated at 450 to 700° C. under 0 to 100% water vapor for 0.3 to 3.5 h, preferably 0.5 to 2.5 h, to afford a "two-exchange two-calcination" ultra-stable rare earth sodium Y molecular sieve; the "two-exchange two-calcination" ultra-stable rare earth sodium Y molecular sieve is then added into deionized water, and the solid content is adjusted to 100 to 400 g/L, with the $Mg^{2+}$/Y zeolite (by mass) being 0.002 to 0.08, preferably 0.002 to 0.04, and the pH being 2.0 to 7.0, preferably 3.0 to 5.0; a reaction is carried out at 0 to 100° C. for 0.3 to 1.5 hours, with or without filtration and washing of the molecular sieve slurry thereafter, so as to afford a magnesium-modified ultra-stable rare earth type Y molecular sieve provided in accordance with the present invention.

In the present invention, alternatively, the process of the magnesium salt exchange modification may also be as follows: an amount of a magnesium salt is divided into two portions; a "one-exchange one-calcination" ultra-stable rare earth sodium Y molecular sieve is added into deionized water first, and the solid content is adjusted to 100 to 400 g/L, with the $NH_4^+$/Y zeolite (by mass) being 0.02 to 0.40, preferably 0.02 to 0.30, the $Mg^{2+}$/Y zeolite (by mass) being 0.002 to 0.08, preferably 0.002 to 0.04, and the pH being 2.5 to 5.0, preferably 3.0 to 4.5; a reaction is carried out at 60 to 95° C. for 0.3 to 1.5 hours, followed by filtration and washing of the molecular sieve slurry, and the resultant filter cake is calcinated at 450 to 700° C. under 0 to 100% water vapor for 0.3 to 3.5 h, preferably 0.5 to 2.5 h, to afford a "two-exchange two-calcination" ultra-stable rare earth sodium Y molecular sieve; the "two-exchange two-calcination" ultra-stable rare earth sodium Y molecular sieve is then added into deionized water, and the solid content is adjusted to 100 to 400 g/L, with the $Mg^{2+}$/Y zeolite (by mass) being 0.002 to 0.08, preferably 0.002 to 0.04, and the pH being 2.0 to 7.0, preferably 3.0 to 5.0; a reaction is carried out at 0 to 100° C. for 0.3 to 1.5 hours, with or without filtration and washing of the molecular sieve slurry thereafter, so as to afford a magnesium-modified ultra-stable rare earth type Y molecular sieve provided in accordance with the present invention.

In the preparation of the molecular sieves according to the present invention, the preparation method of the "one-exchange one-calcination" ultra-stable rare earth sodium Y molecular sieve may be as follows: a NaY molecular sieve is subjected to a rare earth exchange first, followed by filtration and washing after completion of the reaction; the filter cake is then thoroughly mixed with a dispersing agent to carry out a pre-exchange reaction; and finally the filter cake is dried and then calcinated.

In the preparation of the molecular sieves according to the present invention, the preparation method of the "one-exchange one-calcination" ultra-stable rare earth sodium Y molecular sieve may also be as follows: a NaY molecular sieve is subjected to a dispersing pre-exchange first, and after completion of the reaction, filtration and washing are carried out to produce a filter cake; the filter cake is then thoroughly mixed with a rare earth compound solution to carry out a filter cake exchange, and after completion of the reaction, the filter cake is dried and then calcinated.

In the preparation of the molecular sieves according to the present invention, the preparation method of the "one-exchange one-calcination" ultra-stable rare earth sodium Y molecular sieve may alternatively be as follows: a NaY molecular sieve is subjected to a dispersing pre-exchange first, and then to a tank-type exchange upon addition of rare earth compounds, followed by filtration, washing and calcination after completion of the reaction.

In the preparation of the molecular sieves according to the present invention, the preparation method of the "one-exchange one-calcination" ultra-stable rare earth sodium Y molecular sieve may also be as follows: a NaY molecular sieve is subjected to a rare earth exchange first; and after completion of the reaction, a dispersing agent is added to carry out dispersing pre-exchange, which is followed by filtration, washing, and calcination.

In the preparation of the molecular sieves according to the present invention, the preparation method of the "one-exchange one-calcination" ultra-stable rare earth sodium Y molecular sieve may alternatively be as follows: a NaY molecular sieve is subjected to a dispersing pre-exchange first; after completion of the reaction, the molecular sieve slurry is subjected to filtration and a rare-earth belt-type exchange in a belt-type filter, followed by washing of the filter cake; and the filter cake after filtration and washing is eventually calcinated; wherein the condition for the rare earth belt-type exchange in the belt-type filter is: an exchange temperature of 60 to 95° C., an exchange pH of 3.2 to 4.8, and a vacuum degree of 0.03 to 0.05 in the belt-type filter.

In the preparation of the molecular sieves according to the present invention, the preparation method of the "one-exchange one-calcination" ultra-stable rare earth sodium Y molecular sieve may also be as follows: a NaY molecular sieve is subjected to a rare earth exchange first; after completion of the reaction, the molecular sieve slurry is subjected to filtration and a belt-type dispersing pre-exchange in a belt-type filter, followed by washing of the filter cake; and the filter cake after filtration and washing is eventually calcinated; wherein the condition for the belt-type dispersing pre-exchange in the belt-type filter is: an addition amount of 0.2% to 7% by weight, an exchange temperature of 0 to 100° C., an exchange duration of 0.1 to 1.5 h, and a vacuum degree of 0.03 to 0.05 in the belt-type filter.

The preparation method of the "one-exchange one-calcination" ultra-stable rare earth sodium Y molecular sieve according to the present invention may also be as follows: after completion of a dispersing pre-exchange of the NaY molecular sieve, a rare earth exchange may be carried out wherein the rare earth compound solution may be divided into several portions, provided that the total amount of rare earth is not changed, to undergo tank-type exchange, belt-type exchange and/or filter cake exchange.

The preparation method of the "one-exchange one-calcination" ultra-stable rare earth sodium Y molecular sieve according to the present invention may also be as follows: the dispersing pre-exchange of the NaY molecular sieve may be carried out wherein the dispersing agent may be divided into several portions, provided that the total amount of the dispersing agent is not changed, to undergo tank-type exchange, belt-type exchange and/or filter cake exchange.

The preparation method of the "one-exchange one-calcination" ultra-stable rare earth sodium Y molecular sieve according to the present invention may also be as follows: a NaY molecular sieve is subjected to a dispersing pre-exchange reaction with a selected dispersing agent first, and then to a rare earth exchange reaction; after completion of the reaction, another dispersing agent is further added to carry out a second dispersing pre-exchange, wherein the molecular sieve may or may not be filtered between the two dispersing pre-exchange reactions.

The effect of the present invention will not be affected by different orders of reaction steps in the present invention.

The rare earth compound according to the present invention is rare earth chloride, rare earth nitrate or rare earth sulfate, and preferably rare earth chloride or rare earth nitrate.

The rare earth according to the present invention may be lanthanum-rich or cerium-rich rare earth, or may be pure lanthanum or pure cerium rare earth.

The magnesium salt according to the present invention may be one or more of magnesium chloride, magnesium nitrate and magnesium sulfate, and preferably magnesium chloride or magnesium nitrate.

DETAILED DESCRIPTION OF PREFERRED EMBODIMENT

Specification of Raw Materials Used in Examples

1. NaY molecular sieves: NaY-1 (the silica/alumina ratio: 4.8, crystallinity: 92%), NaY-2 (the silica/alumina ratio: 4.1, crystallinity: 83%), manufactured by Lanzhou Petrochemical Corporation, Catalyst Division.

2. Ultra-stable "one-exchange one-calcination" molecular sieve samples: crystallinity being 60%, sodium oxide being 4.3 m %, manufactured by Lanzhou Petrochemical Corporation, Catalyst Division.

3. Rare earth solutions: rare earth chloride (rare earth oxide: 277.5 g/L), rare earth nitrate (rare earth oxide: 252 g/L), both of which are industrial grade and purchased from Lanzhou Petrochemical Corporation, Catalyst Division.

4. Sesbania gum powder, boric acid, urea, ethanol, polyacrylamide, oxalic acid, adipic acid, acetic acid, formic acid, hydrochloric acid, nitric acid, citric acid, salicylic acid, tartaric acid, starch, magnesium chloride, and magnesium nitrate, all of which are chemically pure; ammonium chloride, ammonium nitrate, ammonium sulfate, and ammonium oxalate, all of which are industrial grade.

(III) Evaluation of Reactions

ACE heavy oil microreactor: the reaction temperature was 530° C., the catalyst/oil ratio was 5, and the raw oil was Xinjiang oil blended with 30% vacuum residual oil.

Example 1

To a reaction kettle equipped with a heating mantle, 3000 g NaY-1 molecular sieve (dry basis) and a certain amount of deionized water were consecutively added and blended into a slurry having a solid content of 220 g/L, and 82 g boric acid and 105 g sesbania gum powder were added thereto. The temperature was raised to 85° C., an exchange reaction was carried out for 0.5 h under stirring, followed by filtration and washing, the resultant filter cake was placed in a reaction kettle, and then 1.67 L rare earth chloride was added. The system pH was adjusted to 4.0, the temperature was elevated to 80° C., and an exchange reaction was carried out for 0.3 h. The resultant filter cake was dried by flash evaporation such that the moisture content thereof was 30% to 50%, and was finally calcinated under 70% water vapor at 670° C. for 1.0 h to produce a "one-exchange one-calcination" rare earth sodium Y molecular sieve. To a reaction kettle equipped with a heating mantle, 500 g of the "one-exchange one-calcination" ultra-stable rare earth sodium Y molecular sieve (dry basis) and a certain amount of deionized water were added to prepare a slurry having a solid content of 120 g/L, to which 120 g ammonium sulfate was added. The system pH was adjusted to 4.2, the temperature was raised to 90° C., and an exchange reaction was carried out for 0.8 h, followed by filtration and washing. The filter cake was calcinated under 80% water vapor at 560° C. for 2.5 h to produce a "two-exchange two-calcination" rare earth ultra-stable Y molecular sieve. To a reaction kettle equipped with a heating mantle, 500 g of the "two-exchange two-calcination" rare earth ultra-stable Y molecular sieve (dry basis) and a certain amount of deionized water were added and prepared into a slurry having a solid content of 120 g/L, and 52 g magnesium nitrate hexahydrate was added thereto. The temperature was raised to 90° C., an exchange reaction was carried out for 0.8 h, followed by filtration, washing and spray drying, so as to produce the active component of a magnesium-modified rare earth ultra-stable Y molecular sieve according to the present invention, designated as Modified Molecular Sieve A-1.

Example 2

To a reaction kettle equipped with a heating mantle, 3000 g NaY-1 molecular sieve (dry basis) and a certain amount of deionized water were consecutively added and blended into a slurry having a solid content of 360 g/L, and 0.82 L rare earth nitrate was added thereto. The system pH was adjusted to 3.3, the temperature was raised to 80° C., and an exchange reaction was carried out for 1.5 h, followed by filtration and washing. The resultant filter cake was placed in a reaction kettle, to which 202 g polyacrylamide and 30 g salicylic acid were then added. The temperature was then elevated to 78° C. for dispersing exchange, and the exchange reaction was carried out for 0.5 h under stirring. The resultant filter cake was dried by flash evaporation such that the moisture content thereof was 30% to 50%, and was finally calcinated under 30% water vapor at 630° C. for 1.8 h to produce a "one-exchange one-calcination" rare earth sodium Y molecular sieve. To a reaction kettle equipped with a heating mantle, 500 g of the "one-exchange one-calcination" ultra-stable rare earth sodium Y molecular sieve (dry basis) and a certain amount of deionized water were added to prepare a slurry having a solid content of 370 g/L, to which 200 g ammonium sulfate was added. The system pH was adjusted to 3.6, the temperature was raised to 90° C., and an exchange reaction was carried out for 1.2 h, followed by filtration and washing. The filter cake was calcinated under 20% water vapor at 600° C. for 0.5 h to produce a "two-exchange two-calcination" rare earth ultra-stable Y molecular sieve. To a reaction kettle equipped with a heating mantle, 500 g of the "two-exchange two-calcination" rare earth ultrastable Y molecular sieve (dry basis) and a certain amount of deionized water were added and prepared into a slurry having a solid content of 120 g/L, and 42 g magnesium chloride hexahydrate was added thereto. The temperature was raised to 90° C., an exchange reaction was carried out for 0.8 h, followed by filtration, washing and spray drying, so as to produce the active component of a magnesium-modified rare earth ultra-stable Y molecular sieve according to the present invention, designated as Modified Molecular Sieve A-2.

Comparative Example 1

This comparative example demonstrates the performance feature of an REUSY prepared without addition of polyacrylamide and salicylic acid during the molecular sieve modification.

An REUSY molecular sieve was prepared according to the method described in Example 2, with the only exception that no polyacrylamide and salicylic acid were added. The resultant magnesium-modified ultra-stable rare earth type Y molecular sieve is designated as DB-1.

Example 3

To a reaction kettle equipped with a heating mantle, 3000 g NaY-1 molecular sieve (dry basis) and deionized water were consecutively added and blended into a slurry having a solid content of 100 g/L, and 180 g citric acid was then added thereto for dispersing pre-exchange. The temperature was raised to 85° C., and the exchange reaction was carried out for 0.5 h. Then 1.08 L rare earth chloride was added thereto. The system pH was adjusted to 4.5, the temperature was raised to 85° C., and an exchange reaction was carried out for 1 h, followed by filtration and washing. The resultant filter cake was dried by flash evaporation such that the moisture content thereof was 30% to 50%, and was finally calcinated under 40% water vapor at 540° C. for 1.5 h to produce a "one-exchange one-calcination" rare earth sodium Y molecular sieve. To a reaction kettle equipped with a heating mantle, 500 g of the "one-exchange one-calcination" ultra-stable rare earth sodium Y molecular sieve (dry basis) and deionized water were added to prepare a slurry having a solid content of 145 g/L, to which 80 g ammonium sulfate was added. The system pH was adjusted to 3.5, the temperature was raised to 90° C., and an exchange reaction was carried out for 1.2 h, followed by filtration and washing. The filter cake was mashed and prepared into a slurry' having a solid content of 120 g/L, and 127 g magnesium chloride hexahydrate was added thereto. The temperature was raised to 90° C., an exchange reaction was carried out for 0.8 h, followed by filtration and washing. The filter cake was calcinated under 50% water vapor at 650° C. for 2 hours, so as to produce a "two-exchange two-calcination" rare earth ultra-stable Y molecular sieve, designated as Modified Molecular Sieve A-3.

Example 4

To a reaction kettle equipped with a heating mantle, 3000 g NaY-1 molecular sieve (dry basis) and deionized water were consecutively added and blended into a slurry having a solid content of 200 g/L, and 32 g HCl was added thereto. The temperature was raised to 85° C., and an exchange reaction was carried out for 0.5 h. Then, 0.22 L rare earth chloride was added. The system pH was adjusted to 4.8, the temperature was raised to 70° C., and an exchange reaction was carried out for 1 h. Subsequently, 48 g urea was added for dispersing exchange, the temperature was raised to 85° C., and the exchange reaction was carried out for 0.8 h under stirring, followed by filtration and washing. The resultant filter cake was placed in a reaction kettle, to which 1.43 L rare earth chloride were then added. The temperature was then elevated to 78° C., and an exchange reaction was carried out for 0.5 h. Then the resultant filter cake was dried by flash evaporation such that the moisture content thereof was 30% to 50%, and was finally calcinated under 40% water vapor at 540° C. for 1.5 h to produce a "one-exchange one-calcination" rare earth sodium Y molecular sieve. To a reaction kettle equipped with a heating mantle, 500 g of the "one-exchange one-calcination" ultra-stable rare earth sodium Y molecular sieve (dry basis) and deionized water were added to prepare a slurry having a solid content of 145 g/L, to which 80 g ammonium sulfate was added. The system pH was adjusted to 3.5, the temperature was raised to 90° C., and an exchange reaction was carried out for 1.2 h, followed by filtration and washing. The filter cake was calcinated under 50% water vapor at 650° C. for 2 h to produce a "two-exchange two-calcination" rare earth ultra-stable Y molecular sieve. To a reaction kettle equipped with a heating mantle, 500 g of the "two-exchange two-calcination" rare earth ultra-stable Y molecular sieve (dry basis) and a certain amount of deionized water were added and prepared into a slurry having a solid content of 120 g/L, and 127 g magnesium chloride hexahydrate was added thereto. The temperature was raised to 90° C., and an exchange reaction was carried out for 0.8 h, followed by filtration, washing and spray drying, so as to produce the active component of a magnesium-modified rare earth ultra-stable Y molecular sieve according to the present invention, designated as Modified Molecular Sieve A-4.

Example 5

To a reaction kettle equipped with a heating mantle, 3000 g NaY-1 molecular sieve (dry basis) and deionized water were consecutively added and blended into a slurry having a solid content of 250 g/L, to which 132 g urea was added. The temperature was raised to 60° C., and an exchange reaction was carried out for 0.8 h under stirring. Then, 0.76 L rare earth chloride was added. The system pH was adjusted to 4.2, the temperature was raised to 85° C., and an exchange reaction was carried out for 1.5 h, followed by filtration and washing. The resultant filter cake was placed in a reaction kettle, to which 39 g adipic acid was then added. The temperature was then elevated to 78° C. for dispersing exchange, and the exchange reaction was carried out for 0.5 h under stirring. After completion of the reaction, filtration and washing were carried out, and the resultant filter cake was dried by flash evaporation such that the moisture content thereof was 30% to 50%, and was finally calcinated under 80% water vapor at 560° C. for 2 h to produce a "one-exchange one-calcination" rare earth sodium Y molecular sieve. To a reaction kettle equipped with a heating mantle, 500 g of the "one-exchange one-calcination" ultra-stable rare earth sodium Y molecular sieve (thy basis) and deionized water were added to prepare a slurry having a solid content of 180 g/L, to which 100 g ammonium sulfate was added. The system pH was adjusted to 4.0, the temperature was raised to 90° C., and an exchange reaction was carried out for 1 h, followed by filtration and washing. The filter cake was mashed and prepared into a slurry having a solid content of 120 g/L, and 127 g magnesium chloride hexahydrate was added thereto. The temperature was raised to 90° C., and an exchange reaction was carried out for 0.8 h, followed by filtration and washing. The filter cake was calcinated under 100% water vapor at 620° C. for 2 h, so as to produce a "two-exchange two-calcination" rare earth ultra-stable Y, designated as Modified Molecular Sieve A-5.

Example 6

To a reaction kettle equipped with a heating mantle, 3000 g NaY-1 molecular sieve (dry basis) and deionized water were consecutively added and blended into a slurry having a solid content of 90 g/L, and 59 g HCl was added thereto to adjust the system pH to 3.8. The temperature was raised to 90° C., and an exchange reaction was carried out for 1 h under stirring. Then, 0.54 L rare earth nitrate was added. The system pH was adjusted to 3.7, the temperature was raised to 80° C., and an exchange reaction was carried out for 0.5 h. After the reaction was completed, 67 g ethanol was added, and a reaction was carried out at 76° C. for 0.6 h, followed by filtration and washing. The resultant filter cake was dried by flash evaporation such that the moisture content thereof was 30% to 50%, and was finally calcinated under 70% water vapor at 450° C. for 2 h to produce a "one-exchange one-calcination" rare earth sodium Y molecular sieve. To a reaction kettle equipped with a heating mantle, 500 g of the "one-exchange one-calcination" ultra-stable rare earth sodium Y molecular sieve (dry basis) and deionized water were added to prepare a slurry having a solid content of 300 g/L, to which 175 g ammonium sulfate was added. The system pH was adjusted to 4.3, the temperature was raised to 90° C., and an exchange reaction was carried out for 0.6 h, followed by filtration and washing. The filter cake was calcinated under 70% water vapor at 650° C. for 1.5 h to produce a "two-exchange two-calcination" rare earth ultra-stable Y molecular sieve. To a reaction kettle equipped with a heating mantle, 500 g of the "two-exchange two-calcination" rare earth ultra-stable Y molecular sieve (dry basis) and a certain amount of deionized water were added and prepared into a slurry having a solid content of 120 g/L, and 127 g magnesium chloride hexahydrate was added thereto. The temperature was raised to 90° C., and an exchange reaction was carried out for 0.8 h, followed by filtration, washing and spray drying, so as to produce the active component of a magnesium-modified rare earth ultra-stable Y molecular sieve according to the present invention, designated as Modified Molecular Sieve A-6.

Example 7

To a reaction kettle equipped with a heating mantle, 3000 g NaY-1 molecular sieve (dry basis) and a certain amount of deionized water were consecutively added and blended into a slurry having a solid content of 180 g/L, and 1.46 L rare earth chloride was added thereto. The system pH was adjusted to 3.5, the temperature was raised to 85° C., and an exchange reaction was carried out for 1.2 h. Then, 108 g ethanol was added. The temperature was raised to 90° C., and an exchange reaction was carried out for 1 h under stirring, followed by filtration and washing. The resultant filter cake was dried by flash evaporation such that the moisture content thereof was 30% to 50%, and was finally calcinated under 50% water vapor at 520° C. for 1.5 h to produce a "one-exchange one-calcination" rare earth sodium Y molecular sieve. To a reaction kettle equipped with a heating mantle, 500 g of the "one-exchange one-calcination" ultra-stable rare earth sodium Y molecular sieve (dry basis) and deionized water were added to prepare a slurry having a solid content of 250 g/L, to which 150 g ammonium sulfate was added. The system pH was adjusted to 4.0, the temperature was raised to 90° C., and an exchange reaction was carried out for 1 h, followed by filtration and washing. The filter cake was mashed and prepared into a slurry having a solid content of 120 g/L, and 127 g magnesium chloride hexahydrate was added thereto. The temperature was raised to 90° C., and an exchange reaction was carried out for 0.8 h, followed by filtration and washing. The filter cake was then calcinated under 100% water vapor at 650° C. for 2 h, so as to produce a "two-exchange two-calcination" rare earth ultra-stable Y molecular sieve, designated as Modified Molecular Sieve A-7.

Example 8

To a reaction kettle equipped with a heating mantle, 3000 g NaY-1 molecular sieve (dry basis) and deionized water were consecutively added and blended into a slurry having a solid content of 150 g/L, to which 43 g HCl was added, and a reaction was carried out at 85° C. for 1 h. Then, 1.68 L rare earth chloride was added. The system pH was adjusted to 3.7, the temperature was raised to 90° C., and an exchange reaction was carried out for 1 h. The molecular sieve slurry was then filtered and subjected to a belt-type exchange with a dispersing agent. The conditions for the belt-type exchange were as follows: 35 g oxalic acid was formulated into a solution of pH 3.4, the temperature was raised to 85° C., and the vacuum degree in the belt-type filter was 0.04. The resultant filter cake was dried by flash evaporation such that the moisture content thereof was 30% to 50%, and was finally calcinated under 10% water vapor at 510° C. for 2.0 h to produce a "one-exchange one-calcination" rare earth sodium Y molecular sieve. To a reaction kettle equipped with a heating mantle, 500 g of the "one-exchange one-calcination" ultra-stable rare earth sodium Y molecular sieve (dry basis) and deionized water were added to prepare a slurry having a solid content of 145 g/L, to which 80 g ammonium sulfate was added. The system pH was adjusted to 3.5, the temperature was raised to 90° C., and an exchange reaction was carried out for 1.2 h, followed by filtration and washing. The filter cake was calcinated under 50% water vapor at 650° C. for 2 h to produce a "two-exchange two-calcination" rare earth ultra-stable Y molecular sieve. To a reaction kettle equipped with a heating mantle, 500 g of the "two-exchange two-calcination" rare earth ultra-stable Y molecular sieve (dry basis) and a certain amount of deionized water were added and prepared into a slurry having a solid content of 120 g/L, and 156 g magnesium nitrate hexahydrate was added thereto. The temperature was raised to 90° C., and an exchange reaction was carried out for 0.8 h, followed by filtration, washing and spray drying, so as to produce the active component of a magnesium-modified rare earth ultra-stable Y molecular sieve according to the present invention, designated as Modified Molecular Sieve A-8.

Comparative Example 2

This comparative example demonstrates the performance feature of an REUSY prepared without adding HCl and oxalic acid during the molecular sieve modification.

An REUSY molecular sieve was prepared according to the method described in Example 8, with the only exception that no HCl and oxalic acid were added. The resultant ultra-stable rare earth type Y molecular sieve is designated as DB-2.

Example 9

To a reaction kettle equipped with a heating mantle, 3000 g NaY-1 molecular sieve (dry basis) and a certain amount of deionized water were consecutively added and blended into a slurry having a solid content of 180 g/L, and 167 g tartaric acid was added thereto. Then the temperature was raised to 85° C., and an exchange reaction was carried out for 0.5 h under stirring. Thereafter, 32 g ethanol was added, and a reaction was carried out at 85° C. for 0.5 h, followed by filtration and washing. The resultant filter cake was placed into a reaction kettle, to which 1.31 L rare earth nitrate was added. The system pH was adjusted to 3.8, the temperature was raised to 80° C., and an exchange reaction was carried out for 1 h. The resultant filter cake was eventually dried by flash evaporation such that the moisture content thereof was 30% to 50%, and was calcinated under 100% water vapor at 480° C. for 1.5 h to produce a "one-exchange one-calcination" rare earth sodium Y molecular sieve. To a reaction kettle equipped with a heating mantle, 500 g of the "one-exchange one-calcination" ultra-stable rare earth sodium Y molecular sieve (dry basis) and deionized water were added to prepare a slurry having a solid content of 220 g/L, to which 80 g ammonium sulfate was added. The system pH was adjusted to 4.5, the temperature was raised to 90° C., and an exchange reaction was carried out for 0.5 h, followed by filtration and washing. The filter cake was mashed and prepared into a slurry having a solid content of 120 g/L, and 169 g magnesium chloride hexahydrate was added thereto. The temperature was raised to 90° C., and an exchange reaction was carried out for 0.8 h, followed by oven drying at 150° C. for 3 hours and subsequent calcination under 100% water vapor at 580° C. for 1.8 h, so as to produce a "two-exchange two-calcination" rare earth ultra-stable Y molecular sieve, designated as Modified Molecular Sieve A-9.

Example 10

To a reaction kettle equipped with a heating mantle, 3000 g NaY-1 molecular sieve (dry basis) and a certain amount of deionized water were consecutively added and blended into a slurry having a solid content of 320 g/L, to which 30 g nitric acid was added. Then the temperature was raised to 85° C., and an exchange reaction was carried out for 0.8 h under stirring. Thereafter, 0.95 L rare earth nitrate was added. The system pH was adjusted to 3.3, the temperature was raised to 80° C., and an exchange reaction was carried out for 1.8 h.

Then 62 g starch was added, and a reaction was carried out at 80° C. for 0.5 h, followed by filtration and washing after completion of the reaction. The resultant filter cake was dried by flash evaporation such that the moisture content thereof was 30% to 50%, and was finally calcinated under 60% water vapor at 560° C. for 2 h to produce a "one-exchange one-calcination" rare earth sodium Y molecular sieve. To a reaction kettle equipped with a heating mantle, 500 g of the "one-exchange one-calcination" ultra-stable rare earth sodium Y molecular sieve (dry basis) and deionized water were added to prepare a slurry having a solid content of 280 g/L, to which 130 g ammonium sulfate was added. The system pH was adjusted to 4.0, the temperature was raised to 90° C., and an exchange reaction was carried out for 0.5 h, followed by filtration and washing. The filter cake was calcinated under 60% water vapor at 680° C. for 1 h to produce a "two-exchange two-calcination" rare earth ultra-stable Y molecular sieve. To a reaction kettle equipped with a heating mantle, 500 g of the "two-exchange two-calcination" rare earth ultra-stable Y molecular sieve (dry basis) and a certain amount of deionized water were added and prepared into a slurry having a solid content of 120 g/L, and 208 g magnesium nitrate hexahydrate was added thereto. The temperature was raised to 90° C., and an exchange reaction was carried out for 0.8 h, followed by filtration, washing and spray drying, so as to produce the active component of a magnesium-modified rare earth ultra-stable Y molecular sieve according to the present invention, designated as Modified Molecular Sieve A-10.

Example 11

To a reaction kettle equipped with a heating mantle, 3000 g NaY-1 molecular sieve (dry basis) and a certain amount of deionized water were consecutively added and blended into a slurry having a solid content of 160 g/L, and 1.40 L rare earth nitrate was added thereto. The system pH was adjusted to 3.7, the temperature was raised to 90° C., and a reaction was carried out for 0.8 h. Thereafter, 48 g citric acid was added thereto. The temperature was raised to 85° C., and an exchange reaction was carried out for 0.5 h under stirring, followed by filtration and washing. To the resultant filter cake, 39 g acetic acid and 76 g urea were added, the temperature was then raised to 95° C., and a reaction was carried out for 0.5 h under stirring. The resultant filter cake was dried by flash evaporation such that the moisture content thereof was 30% to 50%, and was eventually calcinated under 80% water vapor at 580° C. for 2 h to produce a "one-exchange one-calcination" rare earth sodium Y molecular sieve. To a reaction kettle equipped with a heating mantle, 500 g of the "one-exchange one-calcination" ultra-stable rare earth sodium Y molecular sieve (dry basis) and deionized water were added to prepare a slurry having a solid content of 150 g/L, to which 50 g ammonium sulfate was added. The system pH was adjusted to 3.8, the temperature was raised to 90° C., and an exchange reaction was carried out for 1 h, followed by filtration and washing. The filter cake was calcinated under 100% water vapor at 610° C. for 2 h, to produce a "two-exchange two-calcination" rare earth ultra-stable Y molecular sieve. To a reaction kettle equipped with a heating mantle, 500 g of the "two-exchange two-calcination" rare earth ultra-stable Y molecular sieve (dry basis) and a certain amount of deionized water were added and prepared into a slurry having a solid content of 120 g/L, and 169 g magnesium chloride hexahydrate was added thereto. The temperature was raised to 90° C., and an exchange reaction was carried out for 0.8 h, followed by filtration, washing and spray drying, so as to produce the active component of a magnesium-modified rare earth ultra-stable Y molecular sieve according to the present invention, designated as Modified Molecular Sieve A-11.

Example 12

To a reaction kettle equipped with a heating mantle, 3000 g NaY-1 molecular sieve (dry basis) and a certain amount of deionized water were consecutively added and blended into a slurry having a solid content of 180 g/L, to which 32 g formic acid and 68 g ethanol were added. Then the temperature was raised to 85° C., and an exchange reaction was carried out for 1.5 h under stirring. Thereafter, 0.82 L rare earth nitrate was added. The system pH was adjusted to 3.3, the temperature was raised to 90° C., and an exchange reaction was carried out for 1 h. After the reaction was completed, 48 g formic acid and 30 g ethanol were added, and a reaction was carried out at 85° C. for 0.8 h, followed by filtration and washing. The resultant filter cake was dried by flash evaporation such that the moisture content thereof was 30% to 50%, and was finally calcinated under 10% water vapor at 560° C. for 1.5 h to produce a "one-exchange one-calcination" rare earth sodium Y molecular sieve. To a reaction kettle equipped with a heating mantle, 500 g of the "one-exchange one-calcination" ultra-stable rare earth sodium Y molecular sieve (dry basis) and deionized water were added to prepare a slurry having a solid content of 150 g/L, to which 50 g ammonium sulfate was added. The system pH was adjusted to 4.0, the temperature was raised to 90° C., and an exchange reaction was carried out for 1 h, followed by filtration and washing. The filter cake was calcinated under 60% water vapor at 620° C. for 2 h to produce a "two-exchange two-calcination" rare earth ultra-stable Y molecular sieve. To a reaction kettle equipped with a heating mantle, 500 g of the "two-exchange two-calcination" rare earth ultra-stable Y molecular sieve (dry basis) and a certain amount of deionized water were added and prepared into a slurry having a solid content of 120 g/L, and 169 g magnesium chloride hexahydrate was added thereto. The temperature was raised to 90° C., and an exchange reaction was carried out for 0.8 h, followed by filtration, washing and spray drying, so as to produce the active component of a magnesium-modified rare earth ultra-stable Y molecular sieve according to the present invention, designated as Modified Molecular Sieve A-12.

Example 13

To a reaction kettle equipped with a heating mantle, 3000 g NaY-1 molecular sieve (dry basis) and a certain amount of deionized water were consecutively added and blended into a slurry having a solid content of 350 g/L, and 42 g citric acid and 28 g sesbania gum powder were added thereto. The temperature was then raised to 82° C., and an exchange reaction was carried out for 1.3 h under stirring. After the reaction was completed, 0.56 L rare earth nitrate was added, and an exchange reaction was carried out at 85° C. for 0.8 h. The molecular sieve slurry was then filtered and subjected to a belt-type exchange. The conditions for the belt-type exchange were as follows: the temperature of the rare earth nitrate solution was raised to 88° C., the exchange pH was 4.7, the amount of rare earth nitrate added, in terms of $RE_2O_3$/Y zeolite (by mass), was 0.04, and the vacuum degree in the belt-type filter was 0.03. Thereafter, the resultant filter cake was dried by flash evaporation such that the moisture content thereof was 30% to 50%, and was finally calcinated under 80% water vapor at 530° C. for 1.5 h to produce a "one-exchange one-calcination" rare earth sodium Y molecular sieve. To a reaction kettle equipped with a heating mantle, 500 g of the "one-exchange one-calcination" ultra-stable rare earth sodium Y molecular sieve (dry basis) and deionized water were added to prepare a slurry having a solid content of 150 g/L, to which 100 g ammonium sulfate was added. The system pH was adjusted to 4.0, the temperature was raised to 90° C., and an exchange reaction was carried out for 1 h, followed by filtration and washing. The filter cake was prepared into a slurry having a solid content of 120 g/L, and 208 g magnesium nitrate hexahydrate was added thereto. The temperature was raised to 90° C., and an exchange reaction was carried out for 0.8 h, followed by oven drying at 150° C. for 3 hours and subsequent calcination under 60% water vapor at 620° C. for 2 h, so as to produce a "two-exchange two-calcination" rare earth ultra-stable Y molecular sieve, designated as Modified Molecular Sieve A-13.

Example 14

To a reaction kettle equipped with a heating mantle, 3000 g NaY-1 molecular sieve (dry basis) and a certain amount of deionized water were consecutively added and blended into a slurry having a solid content of 190 g/L, and 78 g urea and 46 g HCl were added to adjust the system pH to 6.5. The temperature was then raised to 90° C., and an exchange reaction was carried out for 0.6 h under stirring. The molecular sieve slurry was then filtered and subjected to a belt-type exchange. The conditions for the belt-type exchange were as follows: the temperature of the rare earth nitrate solution was raised to 88° C., the exchange pH was 4.2, the amount of rare earth nitrate added in terms of $RE_2O_3$/Y zeolite (by mass) was 0.12, and the vacuum degree in the belt-type filter was 0.05. Thereafter, the resultant filter cake was dried by flash evaporation such that the moisture content thereof was 30% to 50%, and was finally calcinated under 100% water vapor at 580° C. for 2 h to produce a "one-exchange one-calcination" rare earth sodium Y molecular sieve. To a reaction kettle equipped with a heating mantle, 500 g of the "one-exchange one-calcination" ultra-stable rare earth sodium Y molecular sieve (dry basis) and deionized water were added to prepare a slurry having a solid content of 150 g/L, to which 160 g ammonium sulfate was added. The system pH was adjusted to 4.0, the temperature was raised to 90° C., and an exchange reaction was carried out for 1 h, followed by filtration and washing. The filter cake was calcinated under 60% water vapor at 620° C. for 2 h to produce a "two-exchange two-calcination" rare earth ultra-stable Y molecular sieve. To a reaction kettle equipped with a heating mantle, 500 g of the "two-exchange two-calcination" rare earth ultra-stable Y molecular sieve (dry basis) and a certain amount of deionized water were added and prepared into a slurry having a solid content of 120 g/L, and 169 g magnesium chloride hexahydrate was added thereto. The temperature was raised to 90° C., and an exchange reaction was carried out for 0.8 h, followed by filtration, washing and spray drying, so as to produce the active component of a magnesium-modified rare earth ultra-stable Y molecular sieve according to the present invention, designated as Modified Molecular Sieve A-14.

Comparative Example 3

This comparative example demonstrates the performance feature of an REUSY prepared during the molecular sieve modification where only HCl was added.

An REUSY molecular sieve was prepared according to the method described in Example 14, with the only exception that no HCl was added. The resultant ultra-stable rare earth type Y molecular sieve is designated as DB-3.

Example 15

To a reaction kettle equipped with a heating mantle, 3000 g NaY-1 molecular sieve (dry basis) and a certain amount of deionized water were consecutively added and blended into a slurry having a solid content of 110 g/L, and 42 g sesbania gum powder and 28 g salicylic acid were added to adjust the system pH to 6.2. The temperature was then raised to 89° C., and an exchange reaction was carried out for 1 h under stirring. Afterward, 0.48 L rare earth nitrate was added. The system pH was adjusted to 3.7, the temperature was raised to 83° C., and an exchange reaction was carried out for 1 h. The molecular sieve slurry was then filtered and washed, the resultant filter cake was placed into an exchange tank and mashed, and 1.19 L rare earth nitrate ($RE_2O_3$/Y zeolite was 0.10) was added thereto. The system pH was adjusted to 4.1, the temperature was raised to 78° C., and an exchange reaction was carried out for 0.7 h. Thereafter, the resultant filter cake was dried by flash evaporation such that the moisture content thereof was 30% to 50%, and was finally calcinated under 100% water vapor at 630° C. for 2 h to produce a "one-exchange one-calcination" rare earth sodium Y molecular sieve. To a reaction kettle equipped with a heating mantle, 500 g of the "one-exchange one-calcination" ultra-stable rare earth sodium Y molecular sieve (dry basis) and deionized water were added to prepare a slurry having a solid content of 150 g/L, to which 160 g ammonium sulfate was added. The system pH was adjusted to 4.0, the temperature was raised to 90° C., and an exchange reaction was carried out for 1 h, followed by filtration and washing. The filter cake was calcinated under 60% water vapor at 620° C.

for 2 h, to produce a "two-exchange two-calcination" rare earth ultra-stable Y molecular sieve. To a reaction kettle equipped with a heating mantle, 500 g of the "two-exchange two-calcination" rare earth ultra-stable Y molecular sieve (dry basis) and a certain amount of deionized water were added and prepared into a slurry having a solid content of 120 g/L, and 211 g magnesium chloride hexahydrate was added thereto. The temperature was raised to 90° C., and an exchange reaction was carried out for 0.8 h, followed by filtration, washing and spray drying, so as to produce the active component of a magnesium-modified rare earth ultra-stable Y molecular sieve according to the present invention, designated as Modified Molecular Sieve A-15.

Example 16

To a reaction kettle equipped with a heating mantle, 3000 g NaY-1 molecular sieve (dry basis) and a certain amount of deionized water were consecutively added and blended into a slurry having a solid content of 170 g/L, and 0.18 L rare earth nitrate was added thereto. The system pH was adjusted to 4.1, the temperature was then raised to 80° C., and an exchange reaction was carried out for 1.2 h. The molecular sieve slurry was then filtered and subjected to a belt-type exchange with a dispersing agent. The conditions for the belt-type exchange were as follows: 52 g acetic acid and 146 g citric acid were formulated into a 80 g/L solution, the temperature was raised to 85° C., and the vacuum degree in the belt-type filter was 0.04. Thereafter, the resultant filter cake was dried by flash evaporation such that the moisture content thereof was 30% to 50%, and was finally calcinated under 100% water vapor at 500° C. for 1.5 h to produce a "one-exchange one-calcination" rare earth sodium Y molecular sieve. To a reaction kettle equipped with a heating mantle, 500 g of the "one-exchange one-calcination" ultra-stable rare earth sodium Y molecular sieve (dry basis) and deionized water were added to prepare a slurry having a solid content of 150 g/L, to which 160 g ammonium sulfate was added. The system pH was adjusted to 4.0, the temperature was raised to 90° C., and an exchange reaction was carried out for 1 h, followed by filtration and washing. The filter cake was calcinated under 60% water vapor at 620° C. for 2 h to produce a "two-exchange two-calcination" rare earth ultra-stable Y molecular sieve. To a reaction kettle equipped with a heating mantle, 500 g of the "two-exchange two-calcination" rare earth ultra-stable Y molecular sieve (dry basis) and a certain amount of deionized water were added and prepared into a slurry having a solid content of 120 g/L, and 260 g magnesium nitrate hexahydrate was added thereto. The temperature was raised to 90° C., and an exchange reaction was carried out for 0.8 h, followed by filtration, washing and spray drying, so as to produce the active component of a magnesium-modified rare earth ultra-stable Y molecular sieve according to the present invention, designated as Modified Molecular Sieve A-16.

Example 17

To a reaction kettle equipped with a heating mantle, 3000 g NaY-1 molecular sieve (dry basis) and a certain amount of deionized water were consecutively added and blended into a slurry having a solid content of 350 g/L, and 42 g citric acid and 28 g sesbania gum powder were added thereto. The temperature was then raised to 82° C., and an exchange reaction was carried out for 1.3 h under stirring. After the reaction was completed, 0.56 L rare earth nitrate was added, and an exchange reaction was carried out at 85° C. for 0.8 h. The molecular sieve slurry was then filtered and subjected to a belt-type exchange. The conditions for the belt-type exchange were as follows: the temperature of the rare earth nitrate solution was raised to 88° C., the exchange pH was 4.7, the amount of rare earth nitrate added in term of $RE_2O_3$/Y zeolite (by mass) was 0.04, and the vacuum degree in the belt-type filter was 0.03. Thereafter, the resultant filter cake was dried by flash evaporation such that the moisture content thereof was 30% to 50%, and was finally calcinated under 80% water vapor at 530° C. for 1.5 h to produce a "one-exchange one-calcination" rare earth sodium Y molecular sieve. To a reaction kettle equipped with a heating mantle, 500 g of the "one-exchange one-calcination" ultra-stable rare earth sodium Y molecular sieve (dry basis) and deionized water were added to prepare a slurry having a solid content of 120 g/L, to which 208 g magnesium nitrate hexahydrate was added. The temperature was raised to 90° C., and an exchange reaction was carried out for 0.8 h, followed by filtration and washing. The filter cake was prepared into a slurry having a solid content of 150 g/L, to which 100 g ammonium sulfate was added. The system pH was adjusted to 4.0, the temperature was raised to 90° C., and an exchange reaction was carried out for 1 h, followed by oven drying at 150° C. for 3 h and subsequent calcination under 60% water vapor at 620° C. for 2 h, so as to produce a "two-exchange two-calcination" rare earth ultra-stable Y molecular sieve, designated as Modified Molecular Sieve A-17.

Example 18

To a reaction kettle equipped with a heating mantle, 3000 g NaY-1 molecular sieve (dry basis) and a certain amount of deionized water were consecutively added and blended into a slurry having a solid content of 350 g/L, followed by addition of 42 g citric acid and 28 g sesbania gum powder. The temperature was then raised to 82° C., and an exchange reaction was carried out for 1.3 h under stirring. After the reaction was completed, 0.56 L rare earth nitrate was added, and an exchange reaction was carried out at 85° C. for 0.8 h. The molecular sieve slurry was then filtered and subjected to a belt-type exchange. The conditions for the belt-type exchange were as follows: the temperature of the rare earth nitrate solution was raised to 88° C., the exchange pH was 4.7, the amount of rare earth nitrate added in term of $RE_2O_3$/Y zeolite (by mass) was 0.04, and the vacuum degree in the belt-type filter was 0.03. Thereafter, the resultant filter cake was dried by flash evaporation such that the moisture content thereof was 30% to 50%, and was finally calcinated under 80% water vapor at 530° C. for 1.5 h to produce a "one-exchange one-calcination" rare earth sodium Y molecular sieve. To a reaction kettle equipped with a heating mantle, 500 g of the "one-exchange one-calcination" ultra-stable rare earth sodium Y molecular sieve (dry basis) and deionized water were added to prepare a slurry having a solid content of 150 g/L, to which 100 g ammonium sulfate and 208 g magnesium nitrate hexahydrate were added. The system pH was adjusted to 4.0, the temperature was raised to 90° C., and an exchange reaction was carried out for 1 h, followed by filtration, washing, oven drying at 150° C. for 3 h, and subsequent calcination under 60% water vapor at 620° C. for 2 h, so as to produce a "two-exchange two-calcination" rare earth ultra-stable Y molecular sieve, designated as Modified Molecular Sieve A-18.

Example 19

To a reaction kettle equipped with a heating mantle, 3000 g NaY-1 molecular sieve (dry basis) and a certain amount of deionized water were consecutively added and blended into a slurry having a solid content of 350 g/L, and 42 g citric acid and 28 g sesbania gum powder were added thereto. The temperature was then raised to 82° C., and an exchange reaction was carried out for 1.3 h under stirring. After the reaction was completed, 0.56 L rare earth nitrate was added, and an exchange reaction was carried out at 85° C. for 0.8 h. The molecular sieve slurry was then filtered and subjected to a belt-type exchange. The conditions for the belt-type exchange were as follows: the temperature of the rare earth nitrate solution was raised to 88° C., the exchange pH was 4.7, the amount of rare earth nitrate added in term of $RE_2O_3/Y$ zeolite (by mass) was 0.04, and the vacuum degree in the belt-type filter was 0.03. Thereafter, the resultant filter cake was dried by flash evaporation such that the moisture content thereof was 30% to 50%, and was finally calcinated under 80% water vapor at 530° C. for 1.5 h to produce a "one-exchange one-calcination" rare earth sodium Y molecular sieve. To a reaction kettle equipped with a heating mantle, 500 g of the "one-exchange one-calcination" ultra-stable rare earth sodium Y molecular sieve (dry basis) and deionized water were added to prepare a slurry having a solid content of 150 g/L, to which 100 g ammonium sulfate and 68 g magnesium nitrate hexahydrate were added. The system pH was adjusted to 4.0, the temperature was raised to 90° C., and an exchange reaction was carried out for 1 h, followed by filtration and washing. After oven drying at 150° C. for 3 h and subsequent calcination under 60% water vapor at 620° C. for 2 h, a "two-exchange two-calcination" rare earth ultra-stable Y molecular sieve was produced. 500 g of the "two-exchange two-calcination" rare earth ultra-stable Y molecular sieve (dry basis) and a certain amount of deionized water were prepared into a slurry having a solid content of 120 g/L, to which 140 g magnesium nitrate hexahydrate was added. The temperature was raised to 90° C., and an exchange reaction was carried out for 0.8 h, followed by filtration, washing and spray drying, so as to produce the active component of a magnesium-modified rare earth ultra-stable Y molecular sieve according to the present invention, designated as Modified Molecular Sieve A-19.

Comparative Example 4

In this comparative example, the molecular sieve preparation method described in Example 1 of CN200410058089.3 was used, while the other conditions were the same as those in present Example 15.

To a reaction kettle equipped with a heating mantle, deionized water and 3000 g NaY-1 molecular sieve (dry basis) were consecutively added and blended into a slurry having a solid content of 150 g/L, to which 450 g ammonium sulfate was then added. After stirring at 90° C. for 5 minutes, the system pH was adjusted to 3.8 with HCl, and stirring was continued for 1 hour before filtration. The filter cake was added into 2 kg deionized water, and 1.67 L rare earth nitrate solution was added thereto, followed by stirring at 90° C. for 2 hours. 322 g sodium metaaluminate and 258 g aqueous ammonia were added thereto, and then stirred for 10 minutes, followed by filtration and washing. After drying in an air stream, it was transferred into a calcination furnace, calcinated under water vapor at a weight hourly space velocity of 0.5 h$^{-1}$ at 600° C. for 1.5 hours, and then cooled to afford DB-3A. It was then washed for 15 minutes with ammonium chloride at 90° C. in a molecular sieve:ammonium chloride:water ratio of 1:0.1:10, followed by addition of 211 g magnesium chloride hexahydrate, an exchange reaction for 0.8 h and drying, so as to produce a molecular sieve product, designated as DB-4.

Comparative Example 5

In this comparative example, the molecular sieve preparation method described in CN200510114495.1 was used, while the other conditions were the same as those in Example 16.

3000 g (dry basis) of an ultra-stable "one-exchange one-calcination" molecular sieve sample, manufactured hydrothermally by Lanzhou Petrochemical Corporation, Catalyst Division, was weighed and added into 3 L of a 2N oxalic acid solution and mixed thoroughly under stirring. The temperature was raised to 90 to 100° C., and a reaction was carried out for 1 hour, followed by filtration and washing. The resultant filter cake was put into 6 L deionized water, to which 1.46 L rare earth nitrate solution and subsequently 211 g magnesium chloride hexahydrate were added. The temperature was raised to 90 to 95° C., and a reaction was carried out for 1 hour, followed by filtration and washing. The filter cake was oven dried at 120° C., to produce a molecular sieve sample of this comparative example, designated as DB-5.

Comparative Example 6

In this comparative example, the molecular sieve preparation method described in CN97122039.5 was used, while the other conditions were the same as those in Example 4.

To a reaction kettle equipped with a heating mantle, 3000 g (dry basis) NaY-1 molecular sieve and deionized water were added and blended into a slurry having a solid content of 90 g/L. The temperature was raised to 80° C. under stirring, 59 g HCl was added thereto, and the temperature was maintained for 8 hours. Then 1.65 L rare earth chloride solution and 1200 g solid ammonium chloride were added, and subsequently 211 g magnesium chloride hexahydrate was added. After stirring for 1 h, it was filtered and washed until no chloride ion was detected. The resultant wet filter cake (with a moisture content of 47%) was calcinated at 600° C. for 2 hours, to produce a molecular sieve sample of this comparative example, designated as DB-6.

INDUSTRIAL APPLICABILITY

Methods for Analysis and Evaluation Used in the Examples

1. Lattice parameter ($a_0$): X-ray diffraction.
2. Crystallinity ($C/C_0$): X-ray diffraction.
3. Silica-to-alumina ratio: X-ray diffraction.
4. $Na_2O$ content: flame photometry.
5. $RE_2O_3$ content: colorimetry.
6. Particle size: the instrument used was a MICRO-PLUS laser particle size analyzer, complete Mie theory was applied to the full range, and the test range was 0.05 to 550 μm.

The physical and chemical properties of the ultra-stable rare earth type Y molecular sieves prepared in the Examples and Comparative Examples in connection with the present invention are listed in Table 1.

TABLE 1

Physical and chemical properties of molecular sieves

| Molecular Sieve No. | Rare Earth Oxide m % | Sodium Oxide m % | Magnesium Oxide m % | Lattice Parameter nm | Relative Crystallinity % | Particle size Distribution, μm | |
|---|---|---|---|---|---|---|---|
| | | | | | | D(v, 0.5) | D(v, 0.9) |
| A-1  | 15.42 | 1.08 | 0.83 | 2.470 | 47 | 2.84 | 14.57 |
| A-2  | 6.92  | 0.92 | 0.92 | 2.465 | 55 | 2.73 | 13.69 |
| A-3  | 10.05 | 0.91 | 2.31 | 2.467 | 54 | 2.84 | 13.90 |
| A-4  | 15.28 | 0.93 | 2.70 | 2.471 | 48 | 2.68 | 14.67 |
| A-5  | 7.00  | 1.00 | 2.54 | 2.464 | 55 | 2.95 | 15.72 |
| A-6  | 4.52  | 0.96 | 2.92 | 2.459 | 58 | 2.69 | 12.96 |
| A-7  | 12.22 | 1.03 | 2.20 | 2.468 | 53 | 2.92 | 18.62 |
| A-8  | 15.51 | 0.90 | 2.61 | 2.471 | 47 | 2.90 | 17.25 |
| A-9  | 10.93 | 0.94 | 3.32 | 2.468 | 52 | 2.88 | 16.83 |
| A-10 | 7.94  | 1.01 | 3.95 | 2.466 | 53 | 2.90 | 15.92 |
| A-11 | 11.72 | 1.02 | 3.84 | 2.469 | 51 | 2.91 | 18.48 |
| A-12 | 6.86  | 1.00 | 3.90 | 2.465 | 55 | 2.75 | 17.50 |
| A-13 | 8.70  | 0.82 | 3.41 | 2.466 | 54 | 2.68 | 13.63 |
| A-14 | 11.93 | 0.90 | 3.78 | 2.469 | 51 | 2.92 | 15.84 |
| A-15 | 14.00 | 1.02 | 4.69 | 2.470 | 47 | 2.70 | 16.46 |
| A-16 | 1.53  | 1.09 | 4.72 | 2.454 | 62 | 2.92 | 14.51 |
| A-17 | 8.69  | 0.80 | 2.65 | 2.464 | 55 | 2.66 | 13.52 |
| A-18 | 8.78  | 0.85 | 3.02 | 2.465 | 54 | 2.69 | 13.71 |
| A-19 | 8.72  | 0.78 | 3.47 | 2.466 | 53 | 2.66 | 13.43 |
| DB-1 | 6.72  | 1.06 | 0.83 | 2.468 | 46 | 4.28 | 33.56 |
| DB-2 | 15.42 | 1.04 | 2.81 | 2.473 | 41 | 4.56 | 36.85 |
| DB-3 | 12.00 | 1.62 | 3.82 | 2.470 | 42 | 4.76 | 40.15 |
| DB-4 | 13.94 | 1.70 | 4.65 | 2.472 | 40 | 4.69 | 39.42 |
| DB-5 | 8.24  | 1.53 | 4.03 | 2.468 | 48 | 4.85 | 37.48 |
| DB-6 | 12.80 | 1.81 | 2.37 | 2.469 | 43 | 4.80 | 41.62 |

The ultra-stable rare earth type Y molecular sieves provided in accordance with the present invention are characterized in that the molecular sieve comprises 0.5 to 5% by weight of magnesium oxide, 1 to 20% by weight of rare earth oxide, and not more than 1.2% by weight of sodium oxide, and has a crystallinity of 46 to 63%, a lattice parameter of 2.454 nm to 2.471 nm, and a molecular sieve particle size D(v,0.5) of not more than 3.0 μm and D(v,0.9) of not more than 20 μm.

As can be seen from the data in the above table, 1) the molecular sieves prepared in accordance with the present invention have a sodium oxide content of not more than 1.2 m %, a magnesium oxide content of 0.5 to 5% by weight, a rare earth oxide content of 1 to 20 m %, a lattice parameter of 2.454 nm to 2.471 nm, and a relative crystallinity of 46 to 63%; 2) as compared to the comparative molecular sieves, the molecular sieves prepared in accordance with the present invention have a substantially narrower particle size distribution, with the molecular sieve particle size D(v,0.5) being not more than 3.0 μm and the molecular sieve particle size D(v,0.9) being not more than 20 μm, indicating that the molecular sieve preparation method provided in accordance with the present invention can greatly improve the dispersibility of molecular sieve particles and reduce the degree of particle agglomeration; 3) when an ultra-stable type Y molecular sieve is used as the raw material for molecular sieve modification, a part of fragmental aluminum is present inside the channels due to the lattice contraction after the ultra-stabilization of the molecular sieve, thereby increasing the hindrance to rare earth exchange, and resulting in low utilization of rare earth in Comparative Example 5; 4) the molecular sieve prepared according to Comparative Example 6 has a low utilization of rare earth, because when ammonium is mixed with rare earth for exchange, rare earth ions complete with ammonium ions, which affects the precise localization of rare earth ions.

The molecular sieve products of Examples 1 to 16 and Comparative Examples 1 to 6 each were subjected to three ammonium exchanges under the conditions describe below, in order to investigate the change in rare earth contents in the molecular sieves and in the filtrate, so as to confirm whether or not rare earth ions were located in sodalite cages. The analysis results are shown in Table 2.

Exchange conditions: to a reaction kettle equipped with a heating mantle, 100 g molecular sieve and 0.6 L deionized water were added, and 40 g ammonium salt was added under stirring; the temperature was raised to 85° C., and an exchange reaction was carried out for 1 hour, followed by filtration and by washing with a 0.4 L chemical grade water; the filtrate and the filter cake were collected for rare earth content analysis.

As can be seen from the analysis results in Table 2, as compared with the comparative examples, the molecular sieves prepared by the type Y molecular sieve modification methods provided in accordance with the present invention have nearly no rare earth ions in the filtrate after three repeated ammonium exchanges. These results show that rare earth ions are all located in sodalite cages in the molecular sieves.

Table 3 shows analysis results about the stability of the ultra-stable rare earth type Y molecular sieves obtained in Examples 1 to 16 and Comparative Examples 1 to 6. The analysis data in Table 3 demonstrates that, as compared to the comparative molecular sieves, the molecular sieves prepared according to the present invention have a molecular sieve collapse temperature increased by 12° C. or more, and a retaining ratio of relative crystallinity increased by 11.6% or more, which show that the preparation methods provided in accordance with the present invention can remarkably improve the thermal stability and hydrothermal stability of molecular sieves.

TABLE 2

Analysis of rare earth content

| Molecular Sieve No. | Rare Earth Oxide | |
|---|---|---|
| | In Molecular Sieve, m % | In Filtrate, g/L |
| A-1 | 15.60 | Not detected |
| A-2 | 6.90 | Not detected |
| A-3 | 10.02 | Trace amount |
| A-4 | 15.33 | Not detected |
| A-5 | 7.22 | Not detected |
| A-6 | 4.60 | Not detected |
| A-7 | 12.34 | Trace amount |
| A-8 | 15.56 | Not detected |
| A-9 | 11.17 | Not detected |
| A-10 | 8.05 | Not detected |
| A-11 | 11.82 | Not detected |
| A-12 | 6.92 | Not detected |
| A-13 | 8.76 | Not detected |
| A-14 | 12.13 | Not detected |
| A-15 | 14.28 | Not detected |
| A-16 | 1.68 | Not detected |
| A-17 | 8.72 | Not detected |
| A-18 | 8.79 | Not detected |
| A-19 | 8.74 | Not detected |
| DB-1 | 6.22 | 0.53 |
| DB-2 | 14.93 | 0.49 |
| DB-3 | 11.38 | 0.66 |
| DB-4 | 12.96 | 0.89 |
| DB-5 | 7.68 | 0.51 |
| DB-6 | 12.21 | 0.59 |

TABLE 3

Analysis results about the activity stability of molecular sieves

| Molecular Sieve No. | Retaining of Relative Crystallinity % | Collapse Temp. ° C. |
|---|---|---|
| A-1 | 69.1 | 1013 |
| A-2 | 73.0 | 1020 |
| A-3 | 73.2 | 1032 |
| A-4 | 70.2 | 1015 |
| A-5 | 70.1 | 1013 |
| A-6 | 70.0 | 1017 |
| A-7 | 70.5 | 1015 |
| A-8 | 71.2 | 1012 |
| A-9 | 72.0 | 1019 |
| A-10 | 71.1 | 1020 |
| A-11 | 69.8 | 1012 |
| A-12 | 72.0 | 1024 |
| A-13 | 69.9 | 1013 |
| A-14 | 71.3 | 1032 |
| A-15 | 69.8 | 1014 |
| A-16 | 71.6 | 1030 |
| A-17 | 71.7 | 1019 |
| A-18 | 71.0 | 1020 |
| A-19 | 71.5 | 1026 |
| DB-1 | 51.8 | 996 |
| DB-2 | 53.2 | 990 |
| DB-3 | 57.1 | 1000 |
| DB-4 | 56.3 | 991 |
| DB-5 | 55.8 | 1000 |
| DB-6 | 57.5 | 997 |

Note:
Retaining of Relative Crystallinity = relative crystallinity (aged sample)/relative crystallinity (fresh sample) × 100%
Aging condition: aging at 800° C., under 100% water vapor for 2 h To investigate the heavy-oil-conversion capacity and the overall product distribution of the molecular sieves according to the present invention, experiments were conducted as follows: an FCC catalyst was prepared on the basis of a catalyst formulation of 35% molecular sieves (including the molecular sieves of the present invention and the comparative molecular sieves), 20% aluminum oxide, 8% alumina sol binder and 37% kaolin, by the conventional preparation method of semi-synthetic catalysts. The heavy oil microreactor activity was evaluated under the following evaluation conditions: the crude oil was Xinjiang catalytic material, the catalyst/oil ratio was 4, and the reaction temperature was 530° C. The evaluation results are shown in Table 4. The evaluation results show that the catalysts prepared using the type Y molecular sieves provided in accordance with the present invention as the active component have superior heavy oil conversion capacity and product selectivity.

TABLE 4

Evaluation results on ACE heavy oil microreactor activity

| | | Catalyst No. | | | | | | |
|---|---|---|---|---|---|---|---|---|
| | | 1 | 2 | 3 | 4 | 5 | 6 | 7 |
| | Molecular Sieve | A-1 | A-5 | A-10 | A-15 | DB-1 | DB-3 | DB-4 |
| Mass Balance m % | Dry gas | 2.93 | 2.76 | 2.64 | 2.81 | 2.73 | 2.72 | 2.74 |
| | Liquified gas | 23.58 | 23.23 | 23.03 | 23.16 | 21.91 | 22.57 | 22.79 |
| | Gasoline | 52.90 | 53.23 | 53.11 | 53.44 | 52.90 | 52.23 | 52.32 |
| | Diesel | 10.34 | 10.71 | 11.43 | 10.52 | 10.57 | 10.53 | 10.31 |
| | Heavy oil | 3.72 | 4.05 | 4.43 | 3.92 | 5.47 | 4.92 | 4.81 |
| | Coke | 6.53 | 6.03 | 5.26 | 6.15 | 6.42 | 7.03 | 7.03 |
| | Total | 100 | 100 | 100 | 100 | 100 | 100 | 100 |
| Conversion, m % | | 85.94 | 85.24 | 84.14 | 85.56 | 83.96 | 84.55 | 84.88 |
| Total liquid yield, m % | | 86.82 | 87.17 | 87.57 | 87.12 | 85.38 | 85.33 | 85.42 |
| Light oil yield, m % | | 63.24 | 63.94 | 64.54 | 63.96 | 63.47 | 62.76 | 62.63 |

In the present invention, NaY molecular sieves are used as raw materials, and no ammonium-containing solution is introduced during the first exchange and first calcination of the NaY molecular sieve, which prevents it from competing with rare earth ions and lowering the exchange utilization of rare earth ions. Moreover, the present invention employs a dispersing pre-exchange to reduce the exchange hindrance and allow rare earth ions to be localized in sodalite cages. Addition of one dispersing agent during the dispersing pre-exchange process is sufficient to produce the effects of the molecular sieves provided in accordance with the present invention, while addition of two or more dispersing agents may reduce the exchange hindrance in both the rare earth liquid phase and the ultra-stabilization process, thereby improving the stability of the molecular sieves and maximizing the cracking performance of the molecular sieves. Upon magnesium modification, the acidity of the molecular sieves may be adjusted to produce type Y molecular sieves having both high stability and high product selectivity. With cracking catalysts prepared using such molecular sieves, the ratio between different reactions in the cracking process can be controlled, further cracking of light oil can be suppressed, and the light oil yield is improved.

The method provided in accordance with the present invention can effectively reduce agglomeration of molecular sieve grains and increase the dispersibility of the molecular sieve, allowing rare earth ions to be completely exchanged into super-cages and sodalite cages of the molecular sieve, and allowing the rare earth ions in the super-cages to completely migrate into sodalite cages of the molecular sieve in the subsequent water-vapor calcination process, which is demonstrated by the observation that after ammonium exchanges of the molecular sieve, the rare earth content in the molecular sieve is not reduced, and there are no rare earth ions present in the filtrate. As rare earth ions are completely located in sodalite cages, framework dealumination in the water-vapor calcination process is suppressed, and the activity stability of the molecular sieve is improved. Also, due to the absence of rare earth ions in the molecular sieve super-cages or on the surface, the intensity and density of acidic centers in the molecular sieve pore channels are reduced, and the coke selectivity and the secondary utilization of active centers of the molecular sieve are increased. Moreover, the method greatly reduces the amount of ammonium salts used during the manufacture of the molecular sieves, and therefore represents a clean molecular sieve modification technique.

What is claimed is:

1. A magnesium-modified ultra-stable rare earth type Y molecular sieve comprising, 0.2% to 5% by weight of magnesium oxide, 1% to 20% by weight of rare earth oxide, and not more than 1.2% by weight of sodium oxide, and having a crystallinity of 46% to 63%, and a lattice parameter of 2.454 nm to 2.471 nm;
   wherein the magnesium-modified molecular sieve is prepared by a process comprising
   treating a NaY molecular sieve used as a raw material to a rare earth exchange, a dispersing pre-exchange, and a first calcination to obtain a "one-exchange one-calcination" rare earth sodium Y molecular sieve; and
   subjecting the "one-exchange one-calcination" rare earth sodium Y molecular sieve to an ammonium salt exchange for sodium reduction, a magnesium salt exchange modification, and a second calcination to produce the magnesium-modified ultra-stable rare earth type Y molecular sieve,
   wherein the magnesium salt exchange modification is carried out after the rare earth exchange and the dispersing pre-exchange, the order of the rare earth exchange and the dispersing pre-exchange is not limited, and the rare earth exchange and the dispersing pre-exchange are consecutively conducted without a calcination process therebetween;
   wherein the dispersing pre-exchange comprises adjusting a concentration of a molecular sieve slurry concentration to a solid content of 80 to 400 g/L and adding 0.2% to 7% by weight of a dispersing agent at an exchange temperature of 0 to 100° C. for 0.1 to 1.5 h; wherein the dispersing agent in the dispersing pre-exchange is selected from one or more of sesbania gum powder, boric acid, urea, ethanol, polyacrylamide, acetic acid, oxalic acid, adipic acid, formic acid, hydrochloric acid, nitric acid, citric acid, salicylic acid, tartaric acid, benzoic acid, and starch; and
   wherein no ammonium salt is used in the rare earth exchange or the dispersing pre-exchange.

2. The magnesium-modified ultra-stable rare earth type Y molecular sieve according to claim 1, wherein the rare earth exchange comprises,
   adjusting the concentration of the molecular sieve slurry to a solid content of 80 to 400 g/L,
   adding a rare earth compound, wherein a rare earth oxide equivalent, $RE_2O_3$, of the rare earth compound and a NaY-molecular sieve are in a mass ratio of 0.005 to 0.25,
   an exchange temperature is 0 to 100° C., an exchange pH is 2.5 to 6.0, and an exchange time is 0.1 to 2 h.

3. The magnesium-modified ultra-stable rare earth type Y molecular sieve according to claim 1, wherein the magnesium salt exchange modification comprises,
   adjusting the molecular sieve slurry's concentration to a solid content of 80 to 400 g/L,
   adding 0.2% to 8% by weight of a magnesium salt for exchange modification,
   an exchange temperature is 0 to 100° C., and an exchange time is 0.1 to 1.5.

4. The magnesium-modified ultra-stable rare earth type Y molecular sieve according to claim 2, wherein the rare earth compound is a rare earth chloride, a rare earth nitrate or a rare earth sulfate.

5. The magnesium-modified ultra-stable rare earth type Y molecular sieve according to claim 2, wherein the rare earth compound is a lanthanum-rich rare earth, a cerium-rich rare earth, a pure lanthanum rare earth, or a pure cerium rare earth.

6. The magnesium-modified ultra-stable rare earth type Y molecular sieve according to claim 3, wherein the magnesium salt is selected from one or more of magnesium chloride, magnesium nitrate, and magnesium sulfate.

7. A method of preparing a magnesium-modified ultra-stable rare earth type Y molecular sieve using a NaY molecular sieve as a raw material, wherein the magnesium-modified ultra-stable rare earth type Y molecular sieve comprises 0.2% to 5% by weight of magnesium oxide, 1% to 20% by weight of rare earth oxide, and not more than 1.2% by weight of sodium oxide, and has a crystallinity of 46% to 63%, and a lattice parameter of 2.454 nm to 2.471 nm, the method comprising
   treating the NaY molecular sieve to a rare earth exchange, a dispersing pre-exchange, and a first calcination to afford a "one-exchange one-calcination" rare earth sodium Y molecular sieve; and subjecting the "one-exchange one-calcination" rare earth sodium Y molecular sieve to an ammonium salt exchange for sodium reduction, a magnesium salt exchange modification, and a second calcination to produce the magnesium-modified ultra-stable rare earth type Y molecular sieve, wherein the magnesium salt exchange modification is carried out after the rare earth exchange and the dispersing pre-exchange, the order of the rare earth exchange and the dispersing pre-exchange is not limited, and the rare earth exchange and the dispersing pre-exchange are consecutively conducted without a calcination process therebetween;

wherein the dispersing pre-exchange comprises adjusting a concentration of a molecular sieve slurry concentration to a solid content of 80 to 400 g/L and adding 0.2% to 7% by weight of a dispersing agent at an exchange temperature of 0 to 100° C. for 0.1 to 1.5 h; wherein the dispersing agent in the dispersing pre-exchange is selected from one or more of sesbania gum powder, boric acid, urea, ethanol, polyacrylamide, acetic acid, oxalic acid, adipic acid, formic acid, hydrochloric acid, nitric acid, citric acid, salicylic acid, tartaric acid, benzoic acid, and starch;

wherein no ammonium salt is used in the rare earth exchange or the dispersing pre-exchange; and wherein the order of the magnesium salt exchange modification and the ammonium salt exchange is not limited, the second calcination is carried out after the ammonium salt exchange for sodium reduction, and the magnesium salt exchange modification is conducted before, after, or both before and after the second calcination.

8. The preparation method according to claim 7, comprising subjecting the "one-exchange one-calcination" rare earth sodium Y molecular sieve to an ammonium salt exchange for sodium reduction and a second calcination, to produce a "two-exchange two-calcination" REUSY molecular sieve, subjecting the "two-exchange two-calcination" REUSY molecular sieve to a magnesium salt exchange modification to produce the magnesium-modified ultra-stable rare earth type Y molecular sieve.

9. The preparation method according to claim 8, further comprising subjecting the "one-exchange one-calcination" rare earth sodium Y molecular sieve to a magnesium salt exchange modification before the second calcination.

10. The preparation method according to claim 7, wherein the ammonium salt exchange for sodium reduction comprises, adding the "one-exchange one-calcination" ultra-stable rare earth sodium Y molecular sieve into deionized water, adjusting the solid content thereof to 100 to 400 g/L, wherein $NH_4^+$ and the NaY molecular sieve are in a mass ratio of 0.02 to 0.40, and the ammonium salt exchange is carried out at a pH of 2.5 to 5.0, a temperature of 60 to 95° C. for 0.3 to 1.5 h; and the second calcination is carried out under 0 to 100% water vapor at 350 to 700° C. for 0.3 to 3.5 h.

11. The preparation method according to claim 7, wherein the "one-exchange one-calcination" ultra-stable rare earth sodium Y molecular sieve is produced by a process comprising treating the NaY molecular sieve to a rare earth exchange followed by filtering to obtain a filter cake;

mixing the filter cake with a dispersing agent for a dispersing pre-exchange reaction, and calcinating the filter cake.

12. The preparation method according to claim 7, wherein the "one-exchange one-calcination" ultra-stable rare earth sodium Y molecular sieve is produced by a process comprising, treating the NaY molecular sieve to a dispersing pre-exchange followed by filtering to afford a filter cake;

mixing the filter cake with a rare earth compound solution for a filter cake exchange, and calcinating the filter cake.

13. The preparation method according to claim 7, wherein the "one-exchange one-calcination" ultra-stable rare earth sodium Y molecular sieve is produced by a process comprising, treating the NaY molecular sieve to a dispersing pre-exchange first, adding a rare earth compound for a tank-type exchange, filtering to obtain a filter cake, and calcinating the filter cake.

14. The preparation method according to claim 7, wherein the "one-exchange one-calcination" ultra-stable rare earth sodium Y molecular sieve is produced by a process comprising, treating the NaY molecular sieve to a rare earth exchange first, adding a dispersing agent for dispersing pre-exchange, filtering to obtain a filter cake, and calcinating the filter cake.

15. The preparation method according to claim 7 comprising, treating the NaY molecular sieve to a dispersing pre-exchange to obtain a molecular sieve slurry, and filtering the molecular sieve slurry followed by a rare earth belt-type exchange in a belt-type filter, wherein the conditions for the rare earth belt-type exchange in the belt-type filter comprises an exchange temperature of 60 to 95° C., an exchange pH of 3.2 to 4.8, and a vacuum degree of 0.03 to 0.05 in the belt-type filter.

16. The preparation method according to claim 7 comprising, treating the NaY molecular sieve to a rare earth exchange first to obtain a molecular sieve slurry, and filtering the molecular sieve slurry followed by a belt-type dispersing pre-exchange in a belt-type filter, wherein the conditions for the belt-type dispersing pre-exchange in the belt-type filter comprises the dispersing agent in an amount of 0.2% to 7% by weight, an exchange temperature of 0 to 100° C., an exchange duration of 0.1 to 1.5 h, and a vacuum degree of 0.03 to 0.05 in the belt-type filter.

17. The preparation method according to claim 7, wherein the rare earth exchange of the NaY molecular sieve tank-type exchange, a belt-type exchange, a filter cake exchange, or combinations thereof.

18. The preparation method according to claim 7, wherein the dispersing pre-exchange comprises a tank-type exchange, a belt-type exchange, a filter cake exchange, or combinations thereof.

19. The preparation method according to claim 7, wherein the dispersing pre-exchange comprises, treating the NaY molecular sieve to a first dispersing pre-exchange reaction with a first dispersing agent, followed by a rare earth exchange reaction;

adding a second dispersing agent for a second dispersing pre-exchange.

20. The preparation method according to claim 7, wherein the magnesium salt exchange modification comprises a tank-type exchange, a belt-type exchange, a filter cake exchange, or combinations thereof.

* * * * *